(12) United States Patent
Kimoto

(10) Patent No.: US 6,920,603 B2
(45) Date of Patent: Jul. 19, 2005

(54) PATH ERROR MONITORING METHOD AND APPARATUS THEREOF

(75) Inventor: Akihiko Kimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/609,491

(22) Filed: Jun. 25, 2003

(65) Prior Publication Data

US 2004/0015770 A1 Jan. 22, 2004

Related U.S. Application Data

(63) Continuation of application No. PCT/JP00/09312, filed on Dec. 27, 2000.

(51) Int. Cl.$^7$ ............................................. H03M 13/09
(52) U.S. Cl. ...................... 714/798; 370/242
(58) Field of Search ............................. 714/798, 799, 714/807; 370/242

(56) References Cited

U.S. PATENT DOCUMENTS

| 4,964,112 | A | * | 10/1990 | Appelmann | ................. | 370/248 |
| 5,434,846 | A | * | 7/1995 | Tremel et al. | ............... | 370/252 |
| 5,631,896 | A | * | 5/1997 | Kawase et al. | ............. | 370/228 |
| 5,781,527 | A | * | 7/1998 | Read et al. | .................. | 370/216 |
| 6,243,844 | B1 | * | 6/2001 | Tonks | ......................... | 714/758 |

FOREIGN PATENT DOCUMENTS

| JP | 3-004623 | 1/1991 |
| JP | 4-267631 | 9/1992 |
| JP | 9-172423 | 6/1997 |
| JP | 2000-341253 | 12/2000 |

* cited by examiner

Primary Examiner—Stephen M. Baker
(74) Attorney, Agent, or Firm—Katten Muchin Rosenman LLP

(57) ABSTRACT

A path error monitoring method is provided for monitoring for an error in a communication path in a synchronous network by using an error detection code inserted into a first predetermined byte in the overhead of transmitted information. The method includes the steps of: performing an error detection code operation for a predetermined range of the transmitted information in a sender side; inserting the obtained error detection code into a second predetermined byte different from the first predetermined byte in the overhead of the transmitted information and sending the inserted transmitted information; performing an error detection code operation for a predetermined range of the inserted transmitted information received in a receiver side; and monitoring for an error in a communication path between the sender side and the receiver side by comparing the obtained error detection code with the second predetermined byte in the inserted transmitted information. Accordingly, even if a redundant communication path is provided in the middle of a communication path, it is possible to determine whether or not there arises an error with respect to only the redundant communication path. As a result, it is possible to avoid an unnecessary path switching operation due to an error in the upper stream to the redundant communication path.

7 Claims, 13 Drawing Sheets

| | | | CONDITION OF COMMUNICATION PATH α | | |
|---|---|---|---|---|---|
| | | | PATH ALARM | NO PATH ALARM | |
| | | | | ERROR | NO ERROR |
| CONDITION OF COMMUNICATION PATH β | PATH ALARM | | H | α | α |
| | NO PATH ALARM | ERROR | β | H | α |
| | | NO ERROR | β | β | H |

FIG.11

|   | b7 | b6 | b5 | b4 | b3 | b2 | b1 | b0 |
|---|----|----|----|----|----|----|----|----|
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| ⋮ | | | | | | | | |
| 61 | 0 | 0 | 0 | 0 | 0 | 0 | 0 | 0 |
| 62 | 0 | 0 | 0 | 0 | 0 | 0 | 0 | 0 |
| 63 | 0 | 1 | 0 | 1 | 0 | 1 | 0 | 1 |
| 64 | 1 | 0 | 1 | 0 | 1 | 0 | 1 | 0 |

64 MULTI-FRAME

PATH ERROR MONITORING METHOD AND APPARATUS THEREOF

This application is a continuation of PCT/JP00/09312, filed Dec. 27, 2000.

TECHNICAL FIELD

The present invention relates to path error monitoring methods and apparatuses thereof and, more particularly, to a path error monitoring method and an apparatus thereof for properly monitoring for errors in a communication path.

BACKGROUND ART

As communication becomes more important, there is a stronger demand that a high-quality stable communication path be offered. With this background, a system in which a communication path has redundancy is generally adopted. In addition, it becomes important to properly monitor for errors in the communication path and eliminate the errors as much as possible.

Recently, particularly with respect to a transmission network, the SDH (Synchronous Digital Hierarchy) interface is mainly used in a synchronous network. In North America, the SDH interface is adopted as SONET (Synchronous Optical Network). In SDH, a cross connecting operation and a switching operation are performed for an individual path.

FIG. 1 shows, for instance, an STM-1 (Synchronous Transport Module Level 1) interface (155 Mbps) in SDH. In an STM-1 interface, one AU4 (Administrative Unit) or three AU3s can be accommodated therein. FIG. 1 illustrates the case where three AU3s are accommodated in the STM-1 interface. An AU3 is formed by adding AUPTR (AU Pointer) to VC3 (Virtual Container 3)+FS (Fixed Staffbyte), and the three AU3s are byte-interleaved-multiplexed. In FIG. 1, dotted X s in SOH (Section OverHead) represent that the bytes are not used.

In FIG. 1, AUPTR that is formed of H1, H2 and H3 bytes in SOH indicates individual frames of VC3+FS, in this case, relative phases (positions) with respect to SOH. In detail, AUPTR indicates positions of J1 bytes in POHs (Pass OverHead). In addition, AUPTR uses B3 bytes in POHs to monitor a path error.

At a path terminal point in a sender side, for each frame of VC3(+FC)s, BIP (Bit Interleaved Parity) is computed in operation ranges as shown in dotted areas in FIGS. 2(A) and 2(B) and then the operation result is inserted into B3 byte in POH in the next frame. Here, FIG. 2(A) illustrates a case of VC3 of SDH, and FIG. 2(B) illustrates a case of STS-1 of SONET.

At a path terminal point in a receiver side, BIP is computed in a manner similar to the sender side. By comparing the operation result with the received B3 byte, each communication path is monitored for communication path errors. In BIP operation, the operation ranges in FIGS. 2(A) and 2(B) are partitioned by a unit of byte (8 bits) and an even parity operation result of the last bit b0 in each byte is inserted into the last bit b0 in B3 byte. A similar operation is also performed for the other bits b1 through b7. Also, the insertion in B3 byte is performed only for transmission apparatuses located at path terminal points. The insertion in B3 byte is not performed for a transmission apparatus that carries out a path cross-connecting operation and a path switching operation halfway through a communication path.

There are a large number of parts for performing a parallel process of $2^n$ (generally 8) bits with respect to signal processing in a transmission apparatus. As a first problem, when these parts for performing the parallel process have trouble such that, for instance, a part for processing a bit fixes the bit as "0" or "1" due to a short circuit and so on, it is impossible to detect such an error in a conventional BIP operation.

In a network where transmission apparatuses A, B, C and D are connected as shown in FIG. 3, a redundant communication path such as BLSR (Bidirectional Line Switched Ring) is provided between the transmission apparatuses B and C. Here, there are path terminal points in the transmission apparatuses A and D, and the transmission apparatuses B and C between the path terminal points serve to monitor the B3 byte and switch the communication path when a path error is detected therein. When a path error occurs between the transmission apparatuses A and B, the transmission apparatus C cannot restore communication between the transmission apparatuses A and B by switching the path. Thus, in this case, the transmission apparatus C basically does not have to switch the path. However, since delay difference actually arises in the redundant communication paths between the transmission apparatuses B and C, time lag is caused with respect to the path error detection in the transmission apparatus C. In this case, if a path error is detected in a currently used communication path, there arises an unnecessary path switching operation in that the communication path is switched to an alternative communication path although an error is not detected at this time. As a second problem, although this path switching operation is not necessary, an administrator is informed that the system has trouble.

DISCLOSURE OF INVENTION

It is an object of the present invention to provide a path error monitoring method and apparatus that can determine whether or not there is an error with respect to only a redundant communication path when a communication path includes the redundant communication path in the middle thereof and detect trouble such that a part for performing a parallel process in the communication path is fixed as "0" or "1".

In order to achieve the above-mentioned objects, there is provided according to one aspect of the present invention a path error monitoring method for monitoring an error in a communication path in a synchronous network by using an error detection code inserted into a first predetermined byte in the overhead of transmitted information, comprising the steps of: performing an error detection code operation for a predetermined range of the transmitted information in a sender side; inserting the obtained error detection code into a second predetermined byte different from the first predetermined byte in the overhead of the transmitted information and sending the inserted transmitted information; performing an error detection code operation for a predetermined range of the inserted transmitted information received in a receiver side; and monitoring an error in a communication path between the sender side and the receiver side by comparing the obtained error detection code with the second predetermined byte in the inserted transmitted information.

According to the above-mentioned path error monitoring method, even if a redundant communication path is provided in the middle of a communication path, it is possible to determine whether or not there arises an error with respect to only the redundant communication path. As a result, it is possible to avoid an unnecessary path switching operation due to an error in the upper stream to the redundant communication path.

BRIEF DESCRIPTION OF DRAWINGS

Other objects, features and advantages of the present invention will become more apparent from the following detailed description when read in conjunction with the accompanying drawings.

FIG. 11 is a diagram illustrating a multiframe pattern generated by a multi-frame generating part;

BEST MODE FOR CARRYING OUT THE INVENTION

A description will now be given, with reference to the accompanying drawings, of embodiments of the present invention.

In the present invention, a sender side in a communication path has an operation circuit for performing a BIP operation for the same (or different) operation range as a conventional BIP operation in which the B3 byte is used and an insertion circuit for inserting a BIP operation result into an unused byte other than the B3 byte in POHs, such as the J1 byte. A receiver side in the middle of the communication path has a circuit for comparing the BIP operation result with the unused byte such as the J1 byte. In this configuration, the present invention can overcome the second problem. In addition, at this time, the present invention can overcome the first problem by periodically using the inserted/checked BIP operation result directly (even parity)/inversely (odd parity). Such sender and receiver sides are not limited to transmission apparatuses in the middle of a communication path. For instance, when the sender and receiver sides are adopted as an input part and an output part, respectively, in one transmission apparatus, it is possible to monitor an error inside the transmission apparatus.

In the following, the present invention will be described by using the example where the operation range is the same as the conventional BIP operation in which the B3 byte is used and the operation result is inserted into the J1 byte in the POH of the next frame.

Figure 1:
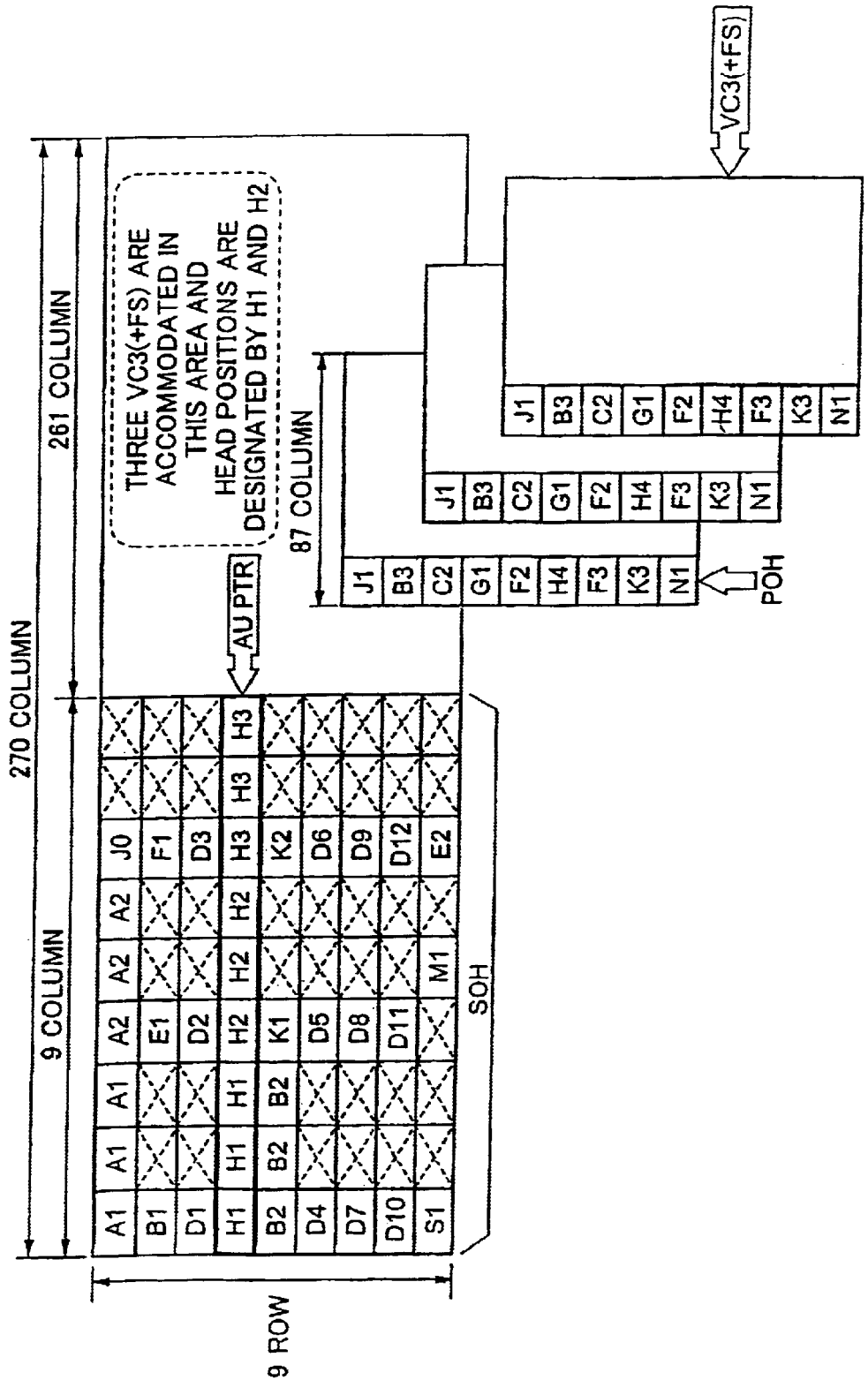
FIG. 1 is a diagram for explaining an STM-1 interface in SDH.
Figure 2:
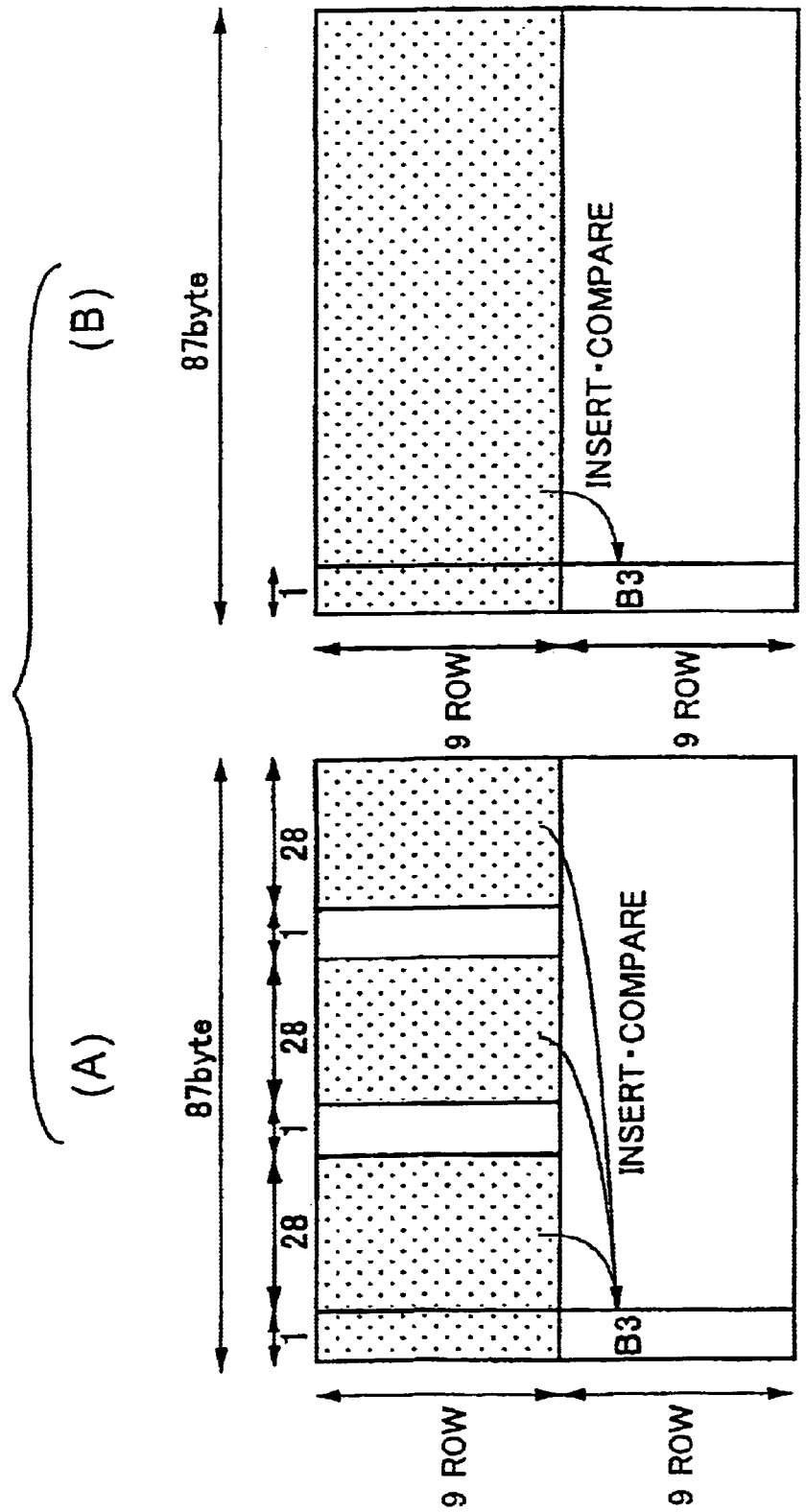
FIG. 2 is a diagram illustrating a BIP operation range.
Figure 3:
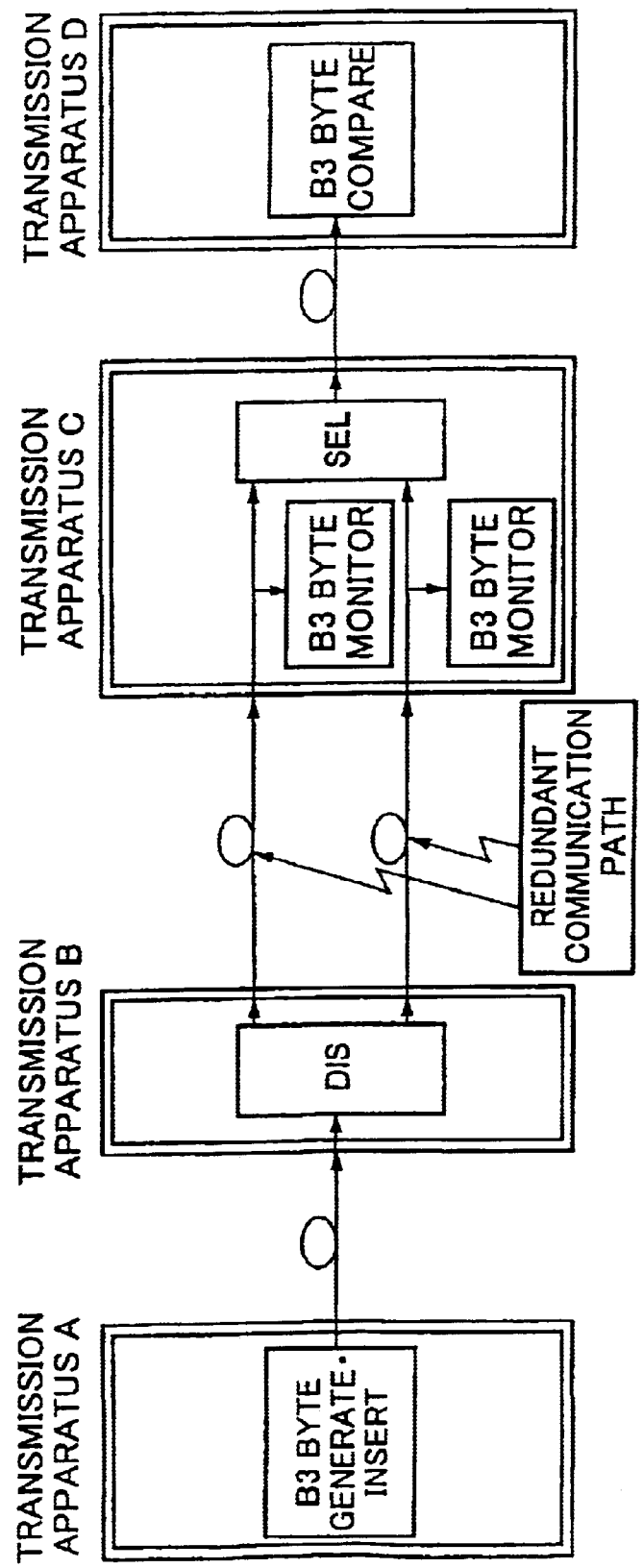
FIG. 3 is a diagram illustrating a structure of a network including redundant communication paths.
Figure 4:
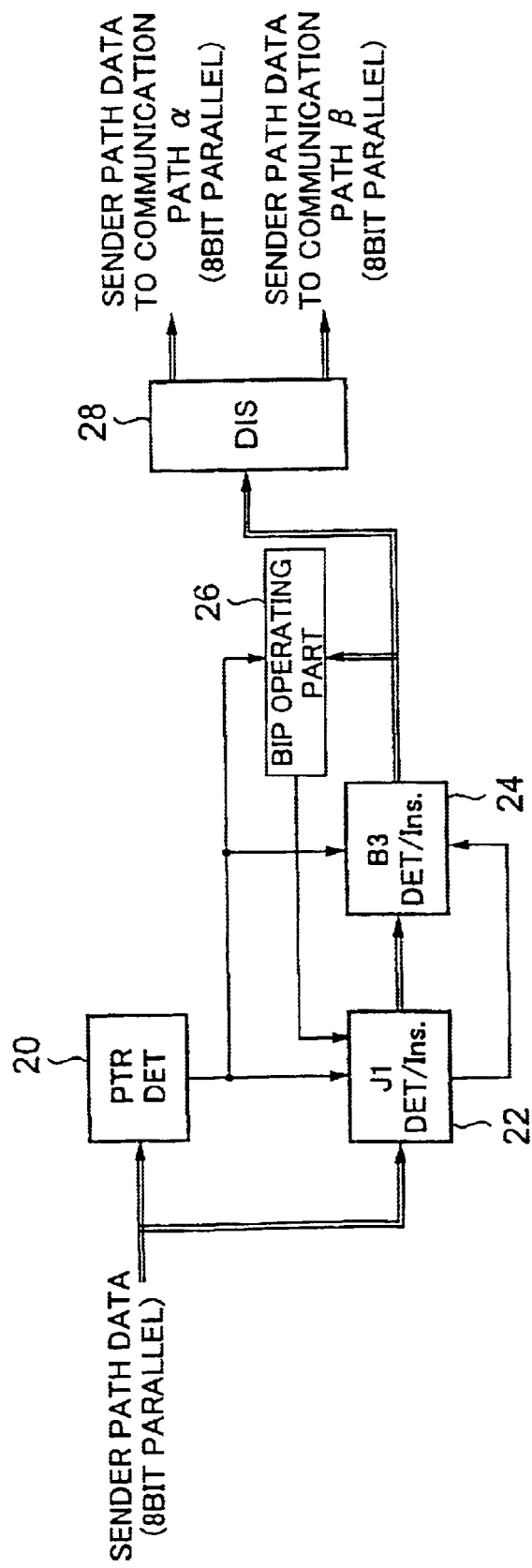
FIG. 4 is a block diagram of a sender side circuit according to a first embodiment of the present invention.
Figure 5:
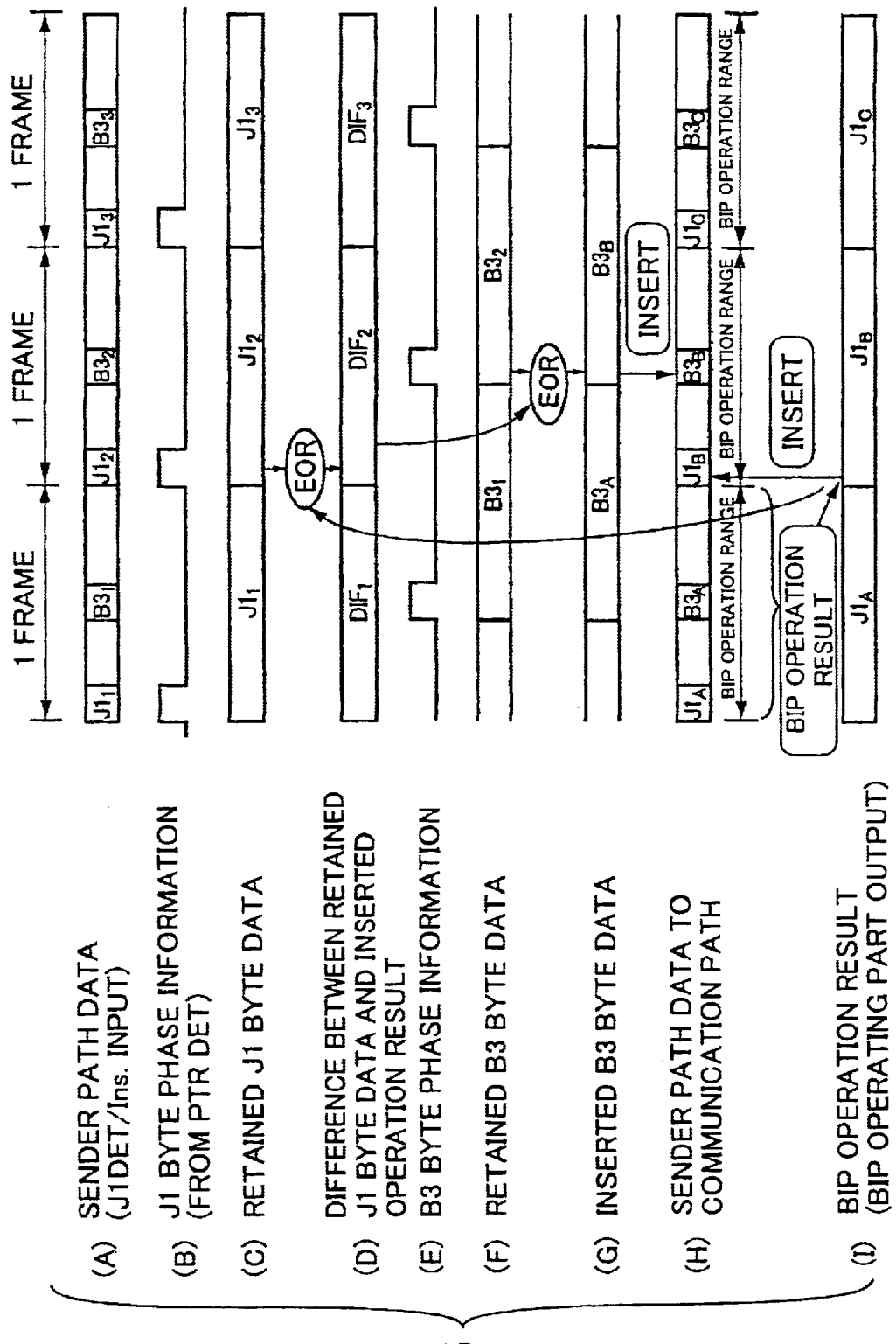
FIG. 5 is a signal timing chart of individual parts of the sender side circuit.

FIG. 4 shows a block diagram of a sender side circuit according to the first embodiment of the present invention. FIG. 5 shows a signal timing chart of individual parts of the sender side circuit. This sender circuit is provided to the transmission apparatus B in FIG. 3. In FIG. 4, a pointer detecting part (PTRDET) 20 detects AUPTR (AU Pointer) from sender path data in FIG. 5(A) supplied in an 8 bit parallel form. If AUPTR has all "1"s therein, the pointer detecting part 20 detects a path alarm (AU-AIS, AU-LOP). Also, if the pointer detecting part 20 does not detect any path alarm, the pointer detecting part 20 generates various timings. Then, the pointer detecting part 20 supplies path alarm information and J1 byte phase information shown in FIG. 5B to a J1 detecting/inserting part (J1DET/Ins.) 22, the path alarm information and B3 byte phase information shown in FIG. 5E to a B3 detecting/inserting part (B3DET/Ins.) 24, and operation range information to a BIP operating part 26.

The J1 detecting/inserting part 22 directly supplies the sender path data other than the J1 byte to the B3 detecting/inserting part 24. Based on the phase information in FIG. 5B from the pointer detecting part 20, the J1 detecting/inserting part 22 retains the J1 byte phase information in FIG. 5B in the sender path data and inserts a BIP operation result shown in FIG. 5B from the BIP operating part 26 into the J1 byte phase. Furthermore, the J1 detecting/inserting part 22 supplies difference information (FIG. 5D), in detail, an EOR (Exclusive OR) operation result by a unit of one bit, between the retained J1 byte phase information and the inserted BIP operation result to the B3 detecting/inserting part 24. Here, if the J1 detecting/inserting part 22 receives a path alarm from the pointer detecting part 20, the J1 detecting/inserting part 24 directly passes all the sender path data to the B3 detecting/inserting part 24 without performing the above-mentioned process.

The B3 detecting/inserting part 24 directly supplies the sender path data other than the B3 byte to the BIP operating part 26 and a distributing part (DIS) 28. Based on the phase information from the pointer detecting part 20 shown in FIG. 5E, the B3 detecting/inserting part 24 retains the B3 byte phase information in the sender path data and inserts difference information between the B3 byte phase information and the difference information from the J1 detecting/inserting part 22 in FIG. 5D into the B3 byte phase again. In detail, the B3 detecting/inserting part 24 performs the EOR operation by a unit of one bit between the B3 byte phase information and the difference information from the J1 detecting/inserting part 22 in FIG. 5(D) and then inserts the difference information into the B3 byte phase again. The inserted data are shown as a signal in FIG. 5(H).

As mentioned above, the EOR operated difference information is provided to the B3 byte as a feedback. If the BIP operation result is inserted into the J1 byte in the operation range of the B3 byte, there arises a B3 byte error in the receiver side. Thus, the value of the B3 byte is determined in accordance with the value of the J1 byte in which the BIP operation value is inserted in order to avoid the above-mentioned B3 byte error. Here, if the B3 detecting/inserting part 24 receives a path alarm from the pointer detecting part 20, the B3 detecting/inserting part 24 directly passes all the sender path data to the BIP operating part 26 and the distributing part 28 without performing the above-mentioned process.

Based on the operation range from the pointer detecting part 20, the BIP operating part 26 performs the BIP operation and then supplies the BIP operation result shown in FIG. 5(I) to the J1 detecting/inserting part 22. The distributing part 28 branches the signal in FIG. 5(H) and then delivers the branched signal to communication paths α and β.

Figure 6:
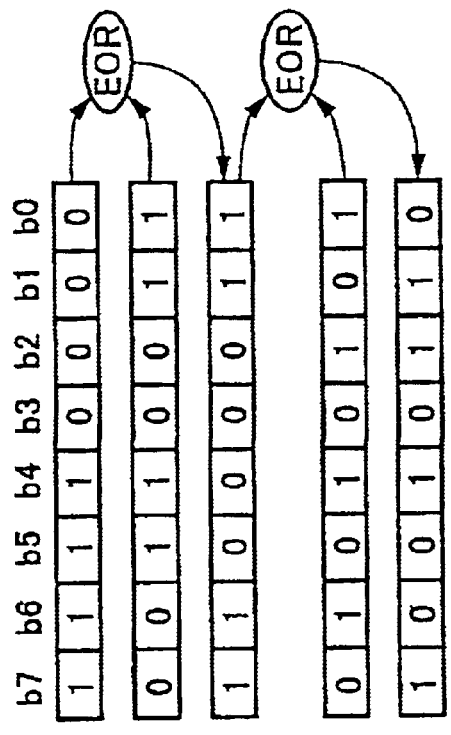
FIG. 6 is a diagram illustrating an example of an EOR operation.

FIG. 6 shows an example of the EOR operation. The J1 detecting/inserting part 22 performs the EOR operation of the J1 byte in FIG. 6(A) and the BIP operation result in FIG. 6(B) and then obtains 1 byte difference information shown in FIG. 6(C). Then, the B3 detecting/inserting part 24 further performs the EOR operation of the difference information in FIG. 6(C) and the retained B3 byte data in FIG. 6(D) and then obtains 1 byte difference information. After that, the B3 detecting/inserting part 24 inserts the obtained 1 byte difference information into the B3 byte phase again.

Figure 7:
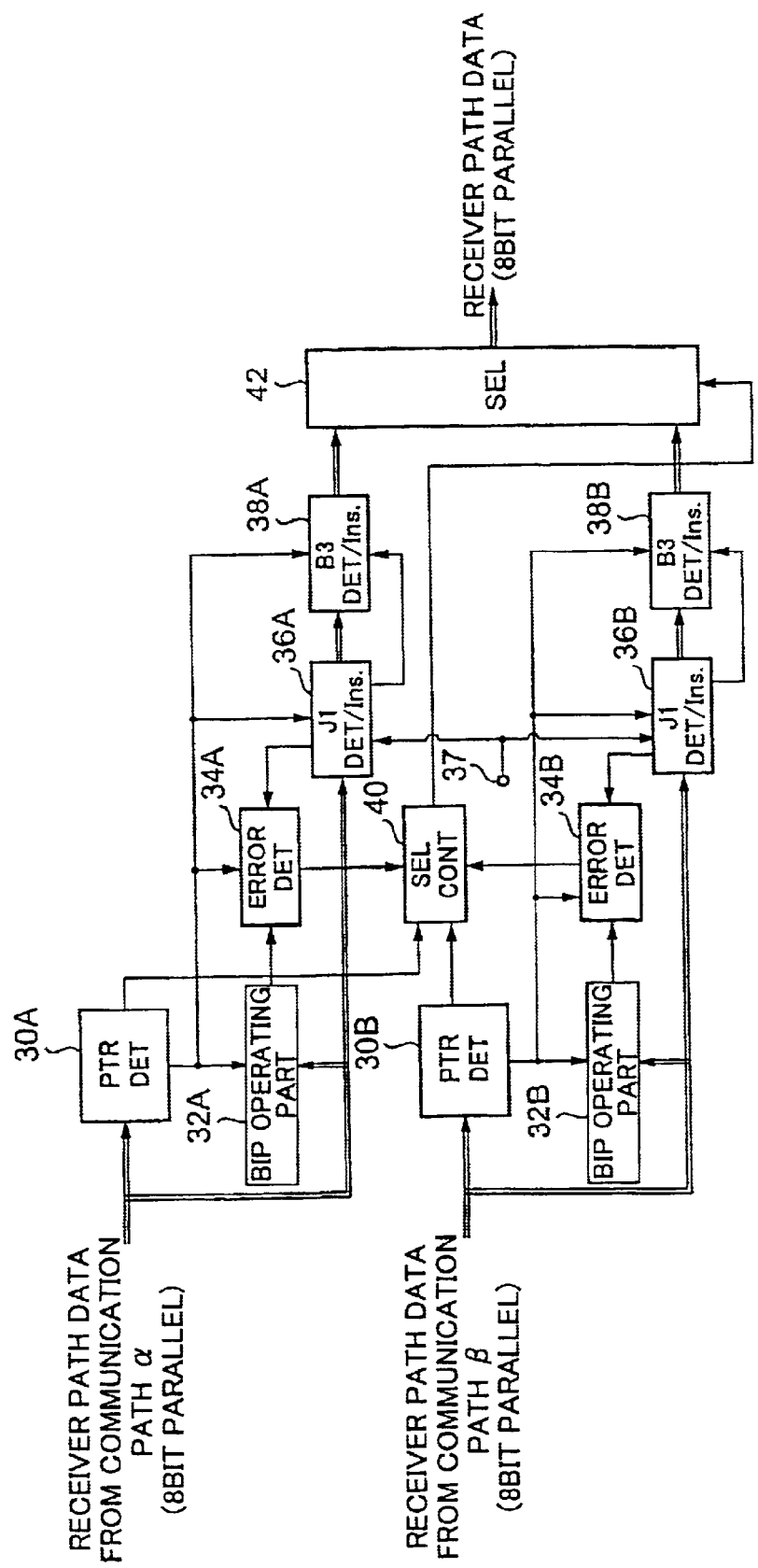
FIG. 7 is a block diagram of a receiver side circuit according to the first embodiment of the present invention.
Figure 8:
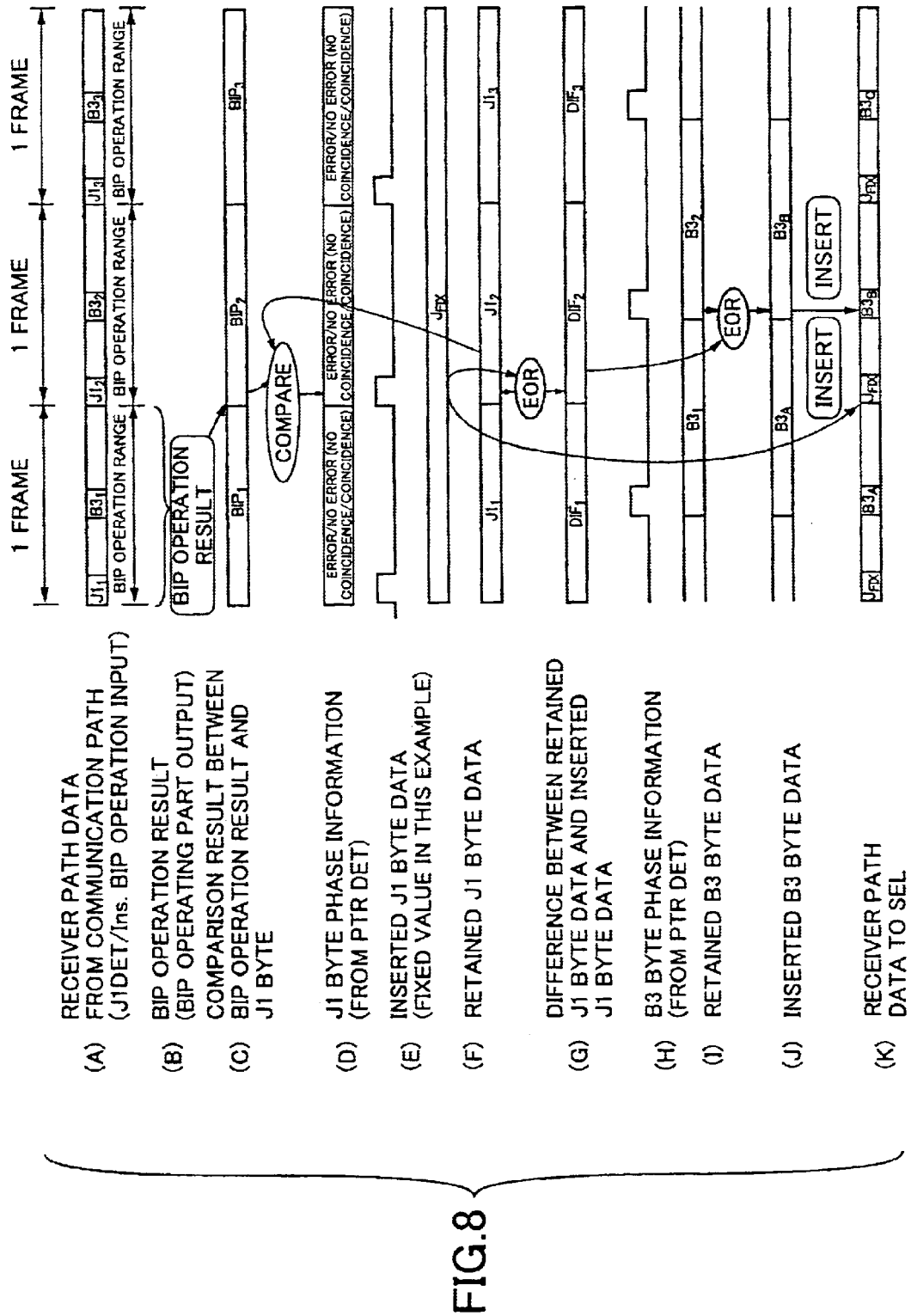
FIG. 8 is a signal timing chart of individual parts of the receiver side circuit.

FIG. 7 is a block diagram of a receiver side circuit according to the first embodiment of the present invention. FIG. 8 shows a signal timing chart of individual parts of the receiver side circuit. This receiver side circuit is provided to the transmission apparatus in FIG. 3. In FIG. 7, a pointer detecting part 30A detects an AU pointer from receiver path data in FIG. 8(A) received through the communication path α in the 8 bit parallel form. If AUPTR has all "1"s therein, the pointer detecting part 30A detects a path alarm (AU-AIS, AU-LOP). Also, if the pointer detecting part 30A does not detect any path alarm, the pointer detecting part 30A generates various timings based on the pointer value. Then, the pointer detecting part 30A supplies operation range information to a BIP operating part 32A, an error detection timing to an error detecting part (ERRORDET) 34A, path alarm information and J1 byte phase information in FIG. 8(D) to a J1 detecting/inserting part 36A, the path alarm information and B3 byte phase information in FIG. 8(H) to a B3 detecting/inserting part 38A, and the path alarm information to a selection control part (SELCONT) 40.

Based on the operation range from the pointer detecting part 30A, the BIP operating part 32A performs the BIP operation and then supplies the BIP operation result shown in FIG. 8(B) to the error detecting part 34A. The error detecting part 34A compares the operation result from the BIP operating part 32A with J1 byte phase information shown in FIG. 8(F) which J1 detecting/inserting part 36A extracts from the receiver path data and then supplies the comparison result, that is, error information, shown in FIG. 8(C) to the selection control part 40.

The J1 detecting/inserting part 36A directly passes the receiver path data other than the J1 byte to the B3 detecting/inserting part 38A. Based on the phase information from the pointer detecting part 30A, the J1 detecting/inserting part 36A retains the J1 byte phase information in FIG. 8(F) in the receiver path data and then supplies the J1 byte phase information to the error detecting part 34A. After that, the J1 detecting/inserting part 36A inserts fixed data (for instance, "FF" in the hexadecimal form) shown in FIG. 8(E) into the J1 byte phase. As a result, it is possible to restore an original value of the J1 byte in which the BIP operation value is inserted in the sender side. Here, the fixed data indicating the original value of the J1 byte is set via a terminal 37 by a control circuit for controlling the entire apparatus. For instance, if the original value of the J1 byte is "00" in the hexadecimal form, the hexadecimal value "00" is set via the terminal 37.

In addition, the J1 detecting/inserting part 36A supplies difference information shown in FIG. 8(G) between the J1 byte phase information and the inserted fixed data, in detail, an EOR operation result by a unit of one bit, to the B3 detecting/inserting part 38A. Here, if the J1 detecting/inserting part 36A receives a path alarm from the pointer detecting part 30A, the J1 detecting/inserting part 36A directly passes all the sender path data to the B3 detecting/inserting part 38A without performing the above-mentioned process.

The B3 detecting/inserting part 38A directly supplies the receiver path data other than the B3 byte to a path switching part (SEL). Based on the phase information from the pointer detecting part 30A shown in FIG. 8(H), the B3 detecting/inserting part 38A retains the B3 byte phase information in the receiver path data in FIG. 8(H) and then obtains difference information between the B3 byte phase information and the difference information from the J1 detecting/inserting part 36A. Then, the obtained difference information is inserted into the B3 byte phase again. In detail, the B3 detecting/inserting part 38A performs the EOR operation of the B3 byte phase information and the difference information from the J1 detecting/inserting part 36A and then inserts the difference information shown into the B3 byte phase again. The inserted data are shown as a signal in FIG. 8(K).

As mentioned above, the EOR operated difference information is provided to the B3 byte as a feedback. If the BIP operation result is inserted into the J1 byte in the operation range of the B3 byte, there arises a B3 byte error. Thus, the value of the B3 byte is determined in accordance with the value of the J1 byte in which the BIP operation value is inserted in order to avoid such a B3 byte error. Here, if the B3 detecting/inserting part 38A receives a path alarm from the pointer detecting part 30A, the B3 detecting/inserting part 38A directly passes all the receiver path data to the path switching part 42 without performing the above-mentioned process.

Also, the pointer detecting part 30B detects an AU pointer in FIG. 8(A) received through the communication path β in the 8 bit parallel form. If AUPTR has all "1"s therein, the pointer detecting part 30B detects a path alarm (AU-AIS, AU-LOP). If the pointer detecting part 30B does not detect any path alarm, the pointer detecting part 30B generates various timings from the pointer value. Then, the pointer detecting part 30B supplies operation range information to a BIP operating part 32B, an error detection timing to an error detecting part (ERRORDET) 34B, path alarm information and J1 byte phase information shown in FIG. 8(D) to a J1 detecting/inserting part 36B, the path alarm information and B3 byte phase information shown in FIG. 8(H) to a B3 detecting/inserting part 38B, and the path alarm information to the selection control part (SELCONT) 40.

Based on the operation range from the pointer detecting part 30B, the BIP operating part 32B perform the BIP operation and then supplies the BIP operation result shown in FIG. 8(B) to the error detecting part 34B. The error detecting part 34B compares the BIP operation result from the BIP operating part 32B with the J1 byte phase information in FIG. 8(F) that the J1 detecting/inserting part 36B extracts from-the receiver path data and then supplies the comparison result, that is, error information, in FIG. 8(C) to the selection control part 40.

The J1 detecting/inserting part 36B directly supplies the receiver path data other than the J1 byte to the B3 detecting/inserting part 38B. Based on the phase information from the pointer detecting part 30B, the J1 detecting/inserting part 36B retains the J1 byte in the receiver path data in FIG. 8(F) and then supplies the J1 byte phase information to the error detecting part 34B. In addition, the J1 detecting/inserting part 36B inserts fixed data (for instance, "FF" in the hexadecimal form) shown in FIG. 8(E) into the J1 byte phase information. Here, the fixed data indicating an original value of the J1 byte is set via the terminal 37 by the control circuit for controlling the entire apparatus.

Furthermore, the J1 detecting/inserting part 36B supplies difference information between the retained J1 byte phase information and the inserted fixed data, in detail, the EOR operation result by a unit of bit shown in FIG. 8(G), to the B3 detecting/inserting part 38B. Here, if the J1 detecting/inserting part 36B receives a path alarm from the pointer detecting part 30B, the J1 detecting/inserting part 36B directly passes all the receiver path data to the B3 detecting/inserting part 38B without performing the above-mentioned process.

The B3 detecting/inserting part 38B supplies the receiver path data other than the B3 byte to the path switching part (SEL) 42. Based on the phase information from the pointer detecting part 30B shown in FIG. 8(H), the B3 detecting/inserting part 38B retains the B3 byte shown in FIG. 8(H) in the receiver path data and obtains difference information between the B3 byte phase information and the difference information from the J1 detecting/inserting part 36B. In detail, the B3 detecting/inserting part 38B performs the EOR operation of the B3 byte and the difference information from the J1 detecting/inserting part 36B by a unit of one bit and then inserts the difference information shown in FIG. 8(J) into the B3 byte phase again. The inserted data are shown as a signal in FIG. 8(K). Here, if the B3 detecting/inserting part 38B receives a path alarm from the pointer detecting part 30B, the B3 detecting/inserting part 38B directly passes all the receiver path data to the path switching part 42 without performing the above-mentioned process.

Figures 9, 10:
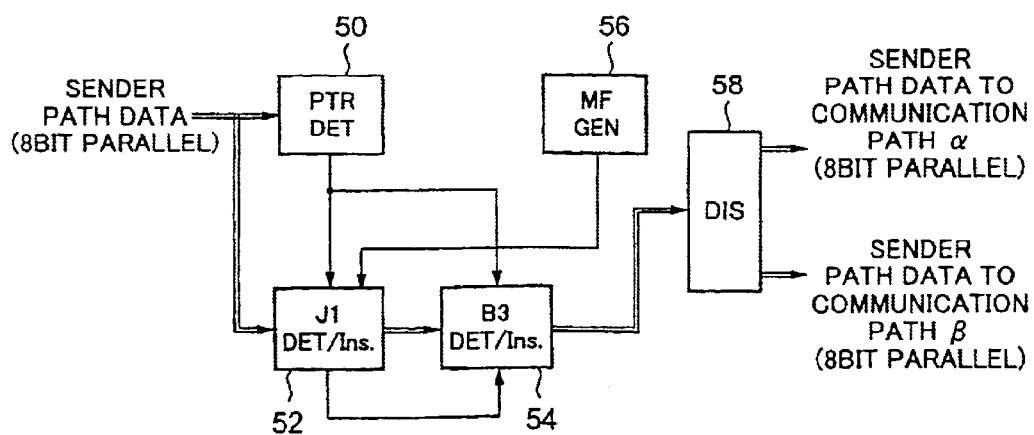
FIG. 9 is a diagram illustrating an example of path selection control by a selection control part.
FIG. 10 is a block diagram illustrating an example of a conventional sender side circuit for performing an uninterruptible switching operation.

Based on the switch information from the selection control part 40, the path switching part 42 switches a path. Based on the path alarm information from the pointer detecting parts 30A and 30B and error information from the error detecting parts 34A and 34B, the selection control part 40 generates path switch information and then supplies the generated path switch information to the selection control part 40. FIG. 9 shows an example of path switching control by the selection control part 40. In FIG. 9, α represents that the communication path α is selected, and β represents that the communication path α is selected. The notation H represents that the current communication path persists.

As mentioned above, it is possible to detect an error between adjacent transmission apparatuses by using the J1 byte. Even if a communication path includes a redundant communication path in the middle thereof, it is possible to determine whether or not there arises an error with respect to only the redundant communication path. As a result, it is possible to avoid an unnecessary path switching operation due to an error in the upper stream of the redundant communication path.

According to the first embodiment, the BIP operation result is directly inserted into the J1 byte. However, the J1 detecting/inserting part 22 in the sender side circuit may switch a frame where the BIP operation result is directly inserted as even parity and a frame where the inverted BIP operation result is inserted as odd parity alternately between every two frames. The error detecting parts 34A and 34B in the receiver side circuit take synchronization of the even parity/the odd parity. Then, the J1 byte is inverted in the even parity frame so as to make comparison with the BIP operation result, and the J1 byte is inverted in the odd parity frame so as to make comparison with the BIP operation result. In this configuration, even if there arises an error such that a portion related to a parallel process during communication is fixed as "0" or "1", it is possible to detect the error.

As a synchronization method for synchronizing the even parity and the odd parity in the error detecting parts 34A and 34B in the receiver side circuit, for instance, if every bit of the BIP operation result coincides with the corresponding bit of the J1 byte in the previous frame and neither bit of the BIP operation result coincides with the corresponding bit of the J1 byte in the current frame, it is determined that the previous frame pertains to the even parity and the current frame pertains to the odd parity. Hereinafter, as long as neither bit of the BIP operation result coincides with the corresponding bit of the J1 byte for two consecutive times, it is considered that the even parity/the odd parity are switched alternately.

Recently, meanwhile, there are a large number of systems that use an uninterruptible switching method for uninterruptibly switching a redundant communication path. In such an uninterruptible switching method, information for identifying a turn of a frame is inserted into a certain byte in POH at the sender side, and synchronization is taken with respect to the frame turn at the receiver side. Then, the order of signals in the redundant communication path is arranged prior to a selector for switching the communication path by using a memory. Then, each signal (path) is monitored through the B3 byte. If the current communication path has an error, even if the error results from only one bit, and the other communication path has no error, the current communication path is switched to the other communication path so as to avoid interruption caused by the error in the redundant communication path.

FIG. 10 is a block diagram of an example of a conventional sender circuit for performing an uninterruptible switching operation. In FIG. 10, a pointer detecting part 50 detects AUPTR from sender path data supplied in 8 bit parallel form in order to detect a path alarm. If the pointer detecting part 50 does not detect any path alarm, the pointer detecting part 50 generates various timings. Then, the pointer detecting part 50 supplies path alarm information and J1 byte phase information to a J1 detecting/inserting part 52, and the path alarm information and B3 byte phase information to a B3 detecting/inserting part 54.

As is shown in FIG. 11, a multi-frame generating part (MFGEN) 56 generates a multi-frame pattern whose individual frame is formed of 1 byte and then supplies the multi-frame pattern to the J1 detecting/inserting part 52. The multi-frame pattern has a fixed pattern formed of all "0"s in the first frame through 62nd frame, "01010101" in the 63rd frame, and "10101010" in the 64th frame.

The J1 detecting/inserting part 52 directly supplies the sender path data other than the J1 byte to the B3 detecting/inserting part 54. Based on the phase information from the pointer detecting part 50, the J1 detecting/inserting part 52 retains J1 byte phase information in the sender path data and then inserts a multi-frame pattern generated by the multi-frame generating part 56 into the J1 byte phase. In addition, the J1 detecting/inserting part 52 supplies difference information between the retained J1 byte phase information and the inserted multi-frame pattern, in detail, the EOR operation result by a unit of bit, to the B3 detecting/inserting part 54. Here, if the J1 detecting/inserting part 52 receives a path alarm from the pointer detecting part 50, the J1 detecting/inserting part 52 directly passes all the sender path data to the B3 detecting/inserting part 54 without performing the above-mentioned process.

The B3 detecting/inserting part 54 directly passes the sender path data other than the B3 byte to a distributing part 58. Based on the phase information from the pointer detecting part 50, the B3 detecting/inserting part 54 retains the B3 byte phase information in the sender path data and obtains difference information between the retained B3 byte phase information and the difference information from the J1 detecting/inserting part 52. In detail, the B3 detecting/inserting part 54 performs the EOR operation of the retained B3 byte phase information and the difference information from the J1 detecting/inserting part 52 and inserts the resulting difference information into the B3 byte phase again. Here, if the B3 detecting/inserting part 54 receives a path alarm from the pointer detecting part 50, the B3 detecting/inserting part 54 directly passes all the sender path data to the distributing part 58 without performing the above-mentioned process. The distributing part 58 branches the supplied signal and delivers the branched signals to the communication paths α and β.

Figure 12:
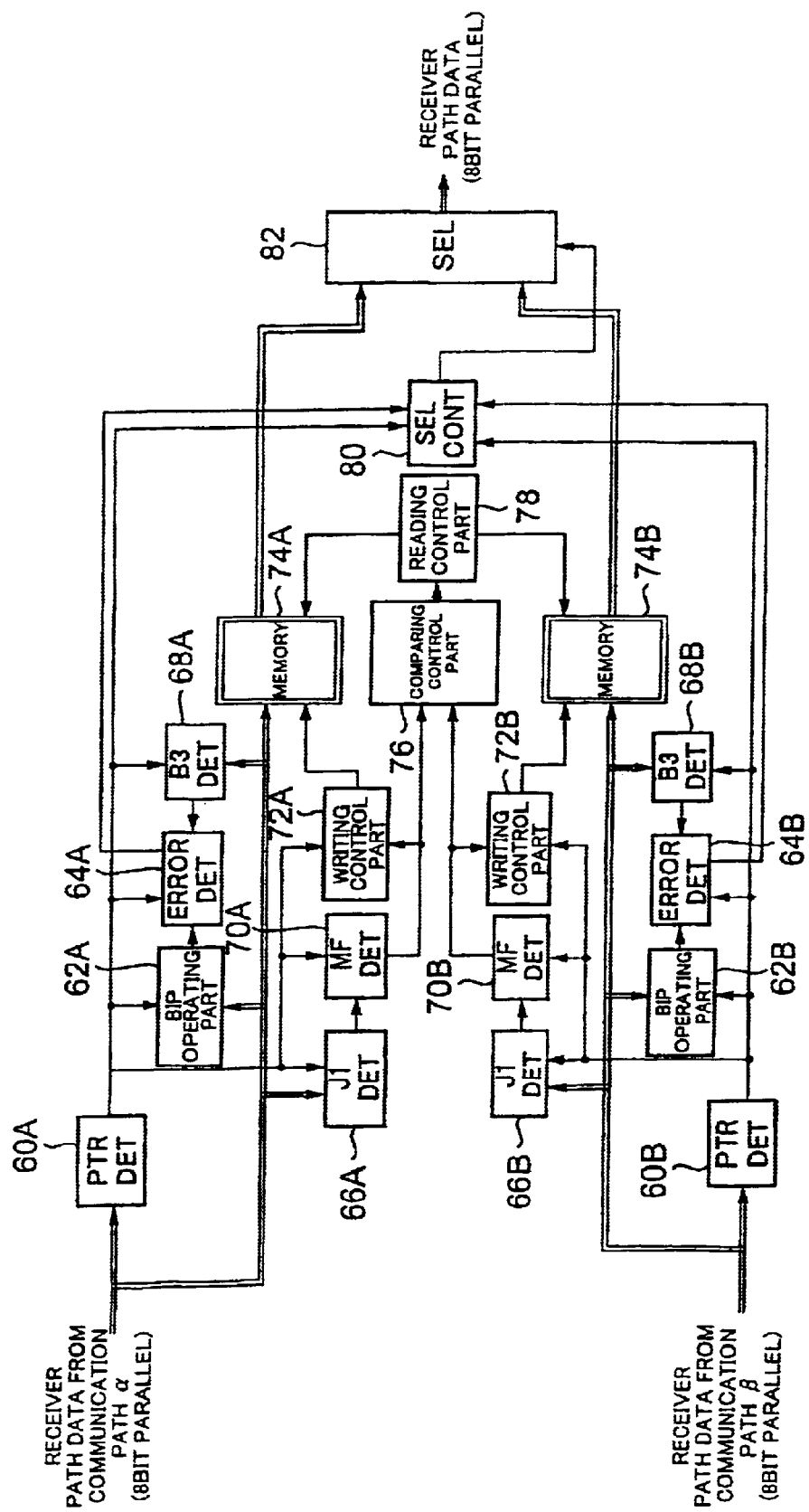
FIG. 12 is a block diagram illustrating an example of a conventional receiver side circuit for performing an uninterruptible switching operation.

FIG. 12 is a block diagram of an example of a conventional receiver circuit for performing an uninterruptible switching operation. In FIG. 12, a pointer detecting part 60A detects an AU pointer from receiver path data supplied from the communication path α in 8 bit parallel form. If AUPTR has all "1"s therein, the pointer detecting part 60A detects a path alarm (AU-AIS, AU-LOP). If the pointer detecting part 60A does not detect any path alarm, the pointer detecting part 60A generates various timings from the pointer value. As a result, the pointer detecting part 60A supplies operation range information to a BIP operating part 62A, an error detection timing to an error detecting part 64A, path alarm information and the J1 byte phase information to a J1 detecting part 66A and a multi-frame detecting part (MFDET) 70A, the B3 byte phase information to a B3 detecting part 68A, the path alarm information and the pointer value to a writing control part 72A, and the path alarm information to a selection control part (SELCONT) 80.

Based on the operation range from the pointer detecting part 60A, the BIP operating part 62A performs BIP operation and then supplies the operation result to the error detecting part 64A. Based on the B3 byte phase information, the B3 detecting part 68A retains B3 byte phase information in the receiver path data and supplies the retained B3 byte phase information to the error detecting part 64A. By comparing the operation result from the BIP operating part 62A with the B3 byte phase information from the B3 detecting part 68A, the error detecting part 64A supplies the comparison result to the selection control part 80.

Based on the J1 byte phase information from the pointer detecting part 60A, the J1 detecting part 66A retains the J1 byte phase information in the received path data and supplies the retained J1 byte phase information to the multi-frame detecting part 70A. Based on the J1 byte phase information from the pointer detecting part 60A, the multi-frame detecting part 70A takes synchronization with the multi-frame inserted into the J1 byte and then supplies the synchronization information to the writing control part 72A and the comparing control part 76. The writing control part 72A supplies to a memory 74A a write address and a write enable generated based on the path alarm information and the pointer value from the pointer detecting part 60A and the multi-frame synchronization information from the multi-frame detecting part 70A.

The pointer detecting part 60B detects an AU pointer from the received path data supplied from the communication path β in 8 bit parallel form. If AUPTR has all "1"s, the pointer detecting part 60B detects a path alarm (AU-AIS, AU-LOP). If the pointer detecting part 60B does not detect any path alarm, the pointer detecting part 60B generates various timings from the pointer value. As a result, the pointer detecting part 60B supplies operation range information to a BIP operating part 62B, an error detection timing to an error detecting part 64B, path alarm information and J1 byte phase information to a J1 detecting part 66B and a multi-frame detecting part (MFDET) 70B, B3 byte phase information to a B3 detecting part 68B, the path alarm information and the pointer value to a writing control part 72B, and the path alarm information to the selection control part (SELCONT) 80.

Based on the operation range from the pointer detecting part 60B, the BIP operating part 62B performs the BIP operation and then supplies the operation result to the error detecting part 64B. Based on the B3 byte phase information, the B3 detecting part 68B retains the B3 byte phase information in the receiver path data and then supplies the retained B3 byte phase information to the error detecting part 64B. By comparing the operation result from the BIP operating part 62B with the B3 byte phase information from the B3 detecting part 68B, the error detecting part 64B supplies the comparison result to the selection control part 80.

Based on the J1 byte phase information from the pointer detecting part 60B, the J1 detecting part 66B retains the J1 byte in the received path data and then supplies the retained J1 byte to the multi-frame detecting part 70B. Based on the J1 byte phase information from the pointer detecting part 60B, the multi-frame detecting part 70B takes synchronization with the multi-frame inserted into the J1 byte and then supplies the synchronization information to the writing control part 72B. The writing control part 72B supplies to a memory 74B a write address and a write enable generated based on the path alarm information and the pointer value from the pointer detecting part 60B and the multi-frame synchronization information from the multi-frame detecting part 70B.

The comparing control part 76 compares the multi-frame synchronization information from the multi-frame detecting part 70A with that from the multi-frame detecting part 70B. The comparing control part 76 determines a readable phase that can be read in the same phase and then supplies the readable phase to a reading control part 78. The reading control part 78 supplies a read address and a read enable information generated based on the readable phase to the memories 74A and 74B.

Based on the path alarm information from the pointer detecting parts 60A and 60B and the error information from the error detecting parts 64A and 64B, the selection control part 40 generates path switch information and then supplies the path switch information to a path switching part 82. The path switching part 82 switches a communication path based on the switch information from the selection control part 80.

Even in the above-mentioned conventional method, when one bit error in the B3 byte is detected, it is possible to perform an uninterruptible switching operation. However, when there is such trouble that a portion for processing a bit becomes "0", there arise a first problem in that the error cannot be detected through a conventional BIP operation and a second problem in that an unnecessary path switching operation is caused due to an error in the upper stream of a redundant communication path. The following second embodiment of the present invention overcomes the first and the second problems.

Figure 13:
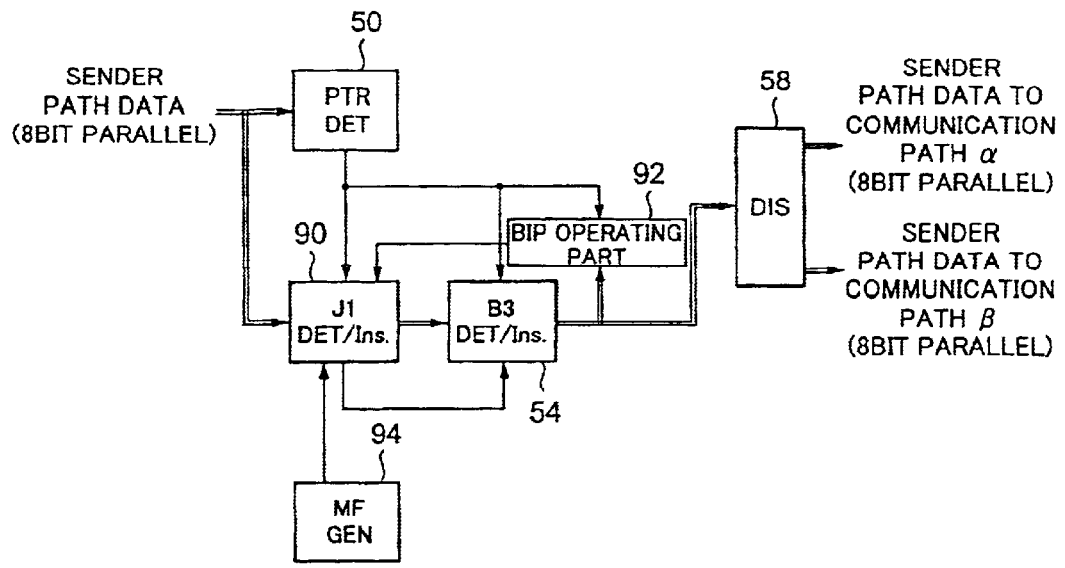
FIG. 13 is a block diagram illustrating a sender side circuit for performing an uninterruptible switching operation according to a second embodiment of the present invention.

FIG. 13 is a block diagram of a sender circuit for performing an uninterruptible switching operation according to the second embodiment of the present invention. This sender circuit is provided to the transmission apparatus B in FIG. 3. In FIG. 13, the same parts as those in FIG. 10 are referred to as the same numerals. In FIG. 13, a pointer detecting part 50 detects AUPTR from sender path data supplied in 8 bit parallel form and then detects a path alarm. If the pointer detecting part 50 does not detect any path alarm, the pointer detecting part 50 generates various timings from the pointer value. Then, the pointer detecting part 50 supplies path alarm information and J1 byte phase information to a J1 detecting/inserting part 90, the path alarm information and B3 byte phase information to a B3 detecting/inserting part 54, and operation range information to a BIP operating part 92.

Based on the operation range from the pointer detecting part 50, the BIP operating part 92 performs BIP operation and then supplies the operation result to the J1 detecting/inserting part 90. A multi-frame generating part 94 supplies multi-frame information for representing the first through the 64th frames to the J1 detecting/inserting part 90.

Figure 14:
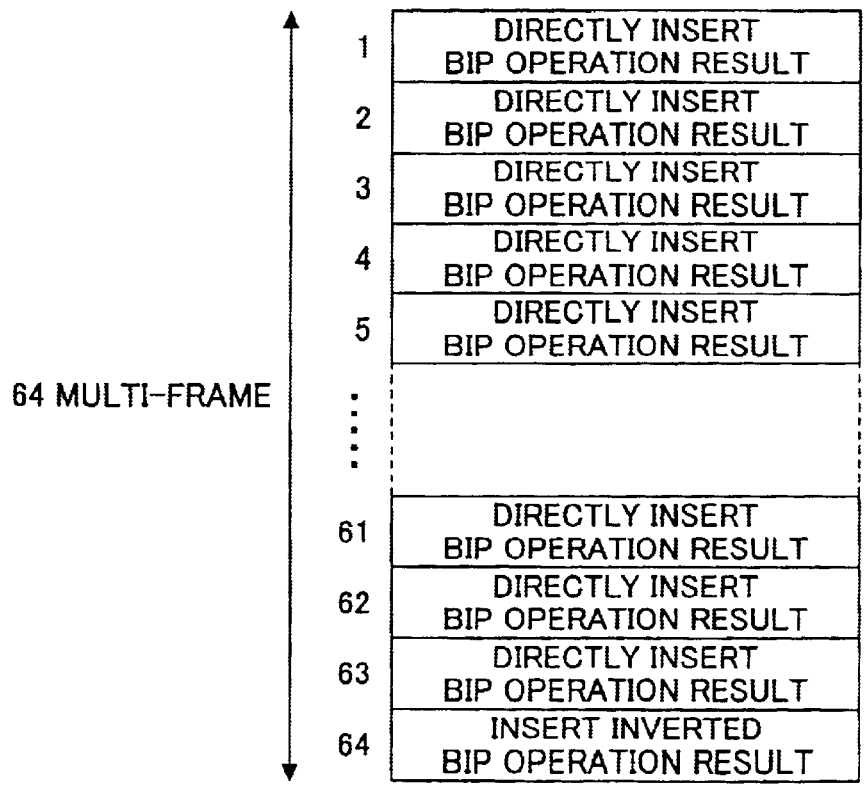
FIG. 14 is a diagram illustrating contents inserted into the J1 byte according to the present invention.

The J1 detecting/inserting part 90 directly supplies sender path data other than the J1 byte to the B3 detecting/inserting part 54. Based on the phase information from the pointer detecting part 50, the J1 detecting/inserting part 90 retains the J1 byte in the sender path data. As is shown in FIG. 14, then, if a multi-frame pattern represents the first through the 63rd frames generated by the multi-frame generating part 94, the J1 detecting/inserting part 90 inserts the BIP operation result supplied from the BIP operating part 92 into the phase of the above-mentioned J1 byte. On the other hand, if the multi-frame pattern represents the 64th frame, the J1 detecting/inserting part 90 inverts the BIP operation result supplied from the BIP operating part 92 and then inserts the inverted BIP operation result into the phase of the above-mentioned J1 byte. Also, the J1 detecting/inserting part 90 supplies difference information between the retained J1 byte and the inserted BIP operation result (or the inverted data thereof), in detail, EOR operation result by a unit of one bit, to the B3 detecting/inserting part 54. Here, if the J1 detecting/inserting part 90 receives a path alarm from the pointer detecting part 50, the J1 detecting/inserting part 90 directly passes all the sender path data to the B3 detecting/inserting part 54 without performing the above-mentioned process.

The B3 detecting/inserting part 54 directly supplies sender path data other than the B3 byte to a distributing part 58. Based on the phase information from the pointer detecting part 50, the B3 detecting/inserting part 54 retains the B3 byte in the sender path data and then obtains difference information between the retained B3 byte and the difference information from the J1 detecting/inserting part 90. In detail, the B3 detecting/inserting part 54 performs EOR operation by a unit of one bit and inserts the difference information into the B3 byte again.

As mentioned above, the EOR operated difference information is provided to the B3 byte as a feedback. If the BIP operation result is inserted into the J1 byte in the operation range of the B3 byte, there arises a B3 byte error in the receiver side. Thus, the value of the B3 byte is determined in accordance with the value of the J1 byte in which the BIP operation value is inserted in order to avoid the above-mentioned B3 byte error. Here, if the B3 detecting/inserting part 54 receives a path alarm from the pointer detecting part 50, the B3 detecting/inserting part 54 directly supplies all the sender path data to the distributing part 58 without performing the above-mentioned process. The distributing part 58 branches the supplied signal and then delivers the branched signal to the communication paths α and β.

Figure 15:
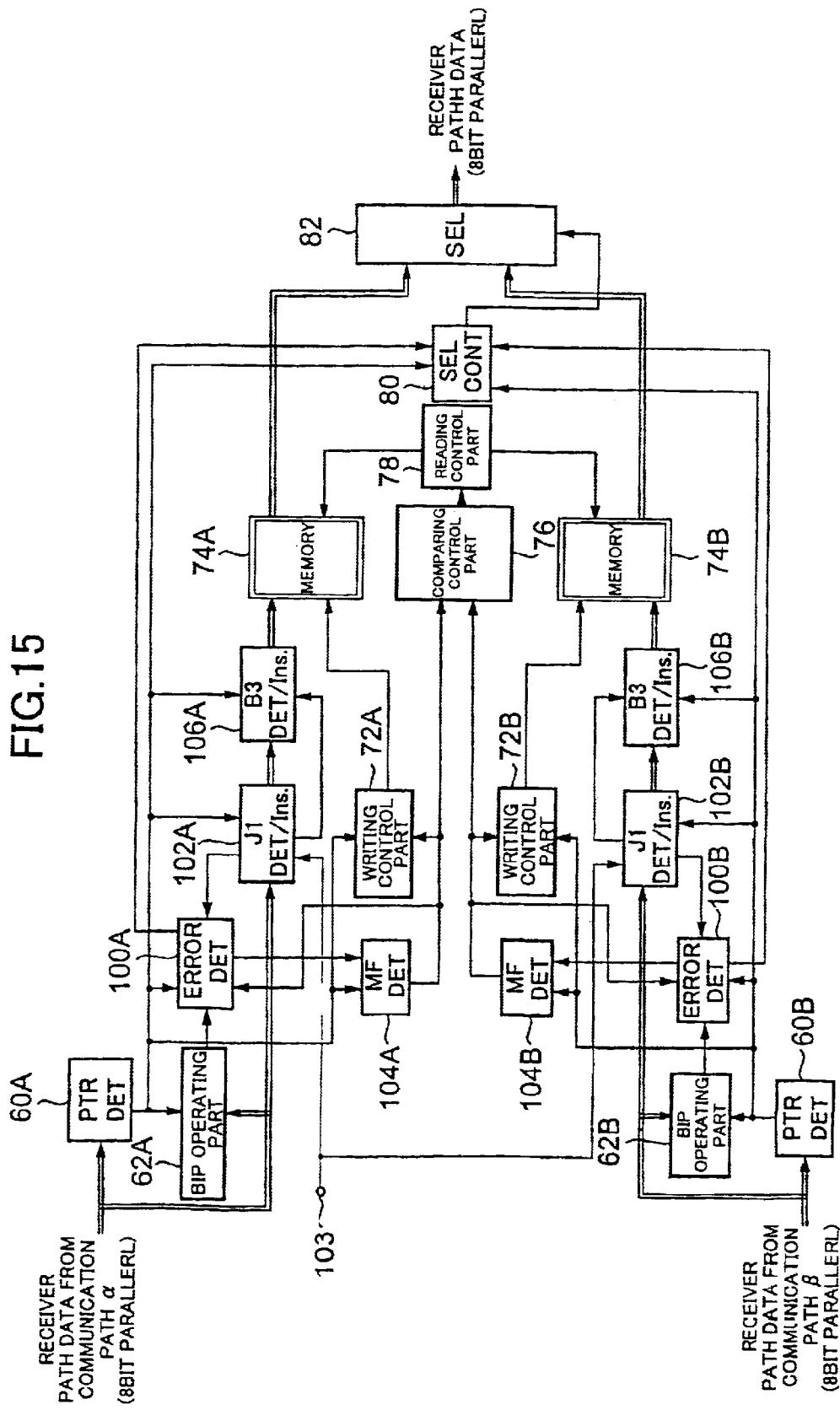
FIG. 15 is a block diagram illustrating a receiver side circuit for performing an uninterruptible switching operation according to the second embodiment of the present invention.

FIG. 15 is a block diagram of a receiver circuit for performing an uninterruptible switching operation according to the second embodiment of the present invention. This receiver circuit is provided to the transmission apparatus C in FIG. 3. In FIG. 15, a pointer detecting part 60A detects an AU pointer in receiver path data supplied from the communication path α in 8 bit parallel form. If AUPTR has all "1"s therein, the pointer detecting part 60A detects a path alarm (AU-AIS, AU-LOP). If the pointer detecting part 60A does not detect any path alarm, the pointer detecting part 60A generates various timings from the pointer value. Then, the pointer detecting part 60A supplies operation range information to a BIP operating part 62A, an error detection timing to an error detecting part 100A, path alarm information and J1 byte phase information to a J1 detecting/inserting part 102A and a multi-frame detecting part 104A, B3 byte phase information to a B3 detecting/inserting part 106A, the path alarm information and the pointer value to a writing control part 72A, and the path alarm information to a selection control part 80.

Based on the operation range from the pointer detecting part 60A, the BIP operating part 62A performs BIP operation and then supplies the operation result to the error detecting part 64A. The J1 detecting/inserting part 102A directly supplies receiver path data other than the J1 byte to the B3 detecting/inserting part 106A. Based on the phase information from the pointer detecting part 100A, the J1 detecting/inserting part 102A retains J1 byte in the receiver path data and supplies the retained J1 byte to the error detecting part 100A. Furthermore, the J1 detecting/inserting part 102A inserts fixed data (for instance, "FF" in the hexadecimal form) into the phase of the J1 byte. As a result, it is possible to restore the J1 byte to which the BIP operation value is inserted in the receiver side. Here, fixed data indicating an original value of the J1 byte is set by a control circuit for controlling the entire apparatus via a terminal 103.

In addition, the J1 detecting/inserting part 102A supplies difference information between the retained J1 byte and the inserted fixed data, in detail, EOR operation result by one unit of bit, to the B3 detecting/inserting part 106A. Here, if the J1 detecting/inserting part 102A receives a path alarm from the pointer detecting part 60A, the J1 detecting/inserting part 102A directly supplies all the sender data to the B3 detecting/inserting part 106A without performing the above-mentioned process.

Based on the phase information from the pointer detecting part 60B, the B3 detecting/inserting part 106A extracts B3 byte from receiver path data and then retains the extracted B3 byte. Then, the B3 detecting/inserting part 106A obtains difference information between the retained B3 byte and the difference information from the J1 detecting/inserting part 36B. In detail, the B3 detecting/inserting part 106A performs EOR operation by a unit of one bit and then inserts the difference information into the B3 byte again.

As mentioned above, the EOR operated difference information is inserted into the B3 byte so that the B3 byte error can be avoided because if the BIP operation value is inserted into the J1 byte in the operation range of the B3 byte, the B3 byte error arises. Here, if the B3 detecting/inserting part 106A receives a path alarm from the pointer detecting part 60B, the B3 detecting/inserting part 106A directly supplies all the receiver path data to a path switching part 82 without performing the above-mentioned process.

By comparing the operation result from the BIP operating part 62A with the J1 byte from the J1 detecting/inserting part 102A, the error detecting part 100A supplies the comparison result, that is, an error condition, to a multi-frame detecting part 104A. Based on multi-frame information from the multi-frame detecting part 104A, the error detecting part 100A compares the J1 byte with the BIP operation result in the first through the 63rd frames and with the inverted BIP operation result in the 64th frame. Then, the error detecting part 100A supplies the comparison result to the selection control part 80.

Based on the comparison result from the error detecting part 100A, for instance, if neither bit coincides in the previous frame and all the bits coincide in a current frame, the multi-frame detecting part 104A takes synchronization with a multi-frame by setting the current frame as the first frame and then supplies the synchronization information to a writing control part 72A and a comparing control part 76. Here, if the multi-frame detecting part 104A receives a path alarm from the pointer detecting part 60A, the multi-frame detecting part 104A retains the current multi-frame synchronization condition and takes the multi-frame synchronization again when the alarm is cancelled.

The writing control part 72A supplies to a memory 74A a write address and a write enable generated based on the path alarm information and the pointer value from the pointer detecting part 60A and the multi-frame synchronization information from the multi-frame detecting part 70A.

A pointer detecting part 60B detects an AU pointer in receiver path data supplied from the communication path β in 8 bit parallel form. If AUPTR has all "1"s therein, the pointer detecting part 60B detects a path alarm (AU-AIS, AU-LOP). If the pointer detecting part 60B does not detect any path alarm, the pointer detecting part 60B generates various timings from the pointer value. Then, the pointer detecting part 60B supplies operation range information to a BIP operating part 62B, an error detection timing to an error detecting part 100B, path alarm information and J1 byte phase information to a J1 detecting/inserting part 102B and a multiframe detecting part 104B, B3 byte phase information to a B3 detecting/inserting part 106B, the path alarm information and the pointer value to a writing control part 72B, and the path alarm information to the selection control part 80.

Based on the operation range from the pointer detecting part 60B, the BIP operating part 62B performs BIP operation and then supplies the operation result to the error detecting part 64B. The J1 detecting/inserting part 102B directly supplies receiver path data other than the J1 byte to the B3 detecting/inserting part 106B. Based on the phase information from the pointer detecting part 60B, the J1 detecting/inserting part 102B retains the J1 byte in the receiver path data and supplies the retained J1 byte to the error detecting part 100B. Furthermore, the J1 detecting/inserting part 102B inserts fixed data (for instance, "FF" in the hexadecimal form) into the phase of the J1 byte. As a result, it is possible to restore the J1 byte to which the BIP operation value is inserted in the receiver side. Here, fixed data indicating an original value of the J1 byte is set by a control circuit for controlling the entire apparatus via the terminal 103.

In addition, the J1 detecting/inserting part 102B supplies difference information between the retained J1 byte and the inserted fixed data, in detail, EOR operation result by a unit of one bit, to the B3 detecting/inserting part 106B. Here, if the J1 detecting/inserting part 102B receives a path alarm from the pointer detecting part 60B, the J1 detecting/ inserting part 102B directly supplies all the sender data to the B3 detecting/inserting part 106B without performing the above-mentioned process.

Based on the phase information from the pointer detecting part 60B, the B3 detecting/inserting part 106B extracts the B3 byte from receiver path data and then retains the extracted B3 byte. Then, the B3 detecting/inserting part 106B obtains difference information between the retained B3 byte and the difference information from the J1 detecting/inserting part 36B. In detail, the B3 detecting/ inserting part 106B performs EOR operation by a unit of one bit and then inserts the difference information into the B3 byte again. Here, if the B3 detecting/inserting part 106B receives a path alarm from the pointer detecting part 60B, the B3 detecting/inserting part 106B directly supplies all the receiver path data to the path switching part 82 without performing the above-mentioned process.

By comparing the operation result from the BIP operating part 62B with the J1 byte from the J1 detecting/inserting part 102B, an error detecting part 100B supplies the comparison result, that is, an error condition, to a multi-frame detecting part 104B. Based on multi-frame information from the multi-frame detecting part 104B, the error detecting part 100B compares the J1 byte with the BIP operation result in the first through the 63rd frames and with the inverted BIP operation result in the 64th frame. Then, the error detecting part 100B supplies the comparison result to the selection control part 80.

Based on the comparison result from the error detecting part 100B, for instance, if neither bit coincides in the previous frame and all the bits coincide in a current frame, the multi-frame detecting part 104B takes synchronization with a multi-frame by setting the current frame as the first frame and then supplies the synchronization information to a writing control part 72B and the comparing control part 76. Here, if the multi-frame detecting part 104B receives a path alarm from the pointer detecting part 60B, the multi-frame detecting part 104B retains the current multi-frame synchronization condition and takes the multi-frame synchronization again when the alarm is cancelled.

The writing control part 72B supplies to a memory 74B a write address and a write enable generated based on the path alarm information and the pointer value from the pointer detecting part 60B and the multi-frame synchronization information from the multi-frame detecting part 70B.

The comparing control part 76 compares the multi-frame synchronization information from the multi-frame detecting part 104A with that from the multi-frame detecting part 104B and determines a readable phase that can be read in the same phase. Then, the comparing control part 76 supplies the readable phase to a reading control part 78. The reading control part 78 supplies a read address and read enable information generated based on the readable phase to the memories 74A and 74B.

The selection control part 40 generates path switch information based on the path alarm information from the pointer detecting parts 60A and 60B and error information from the error detecting parts 64A and 64B to the path switching part 82. Based on the path switch information from the selection control part 80, the path switching part 82 switches a communication path.

In the above embodiment, even if there is an error prior to the redundant communication path, it is possible to determine whether or not there is an error with respect to only the redundant communication path by detecting a 1 bit error in the J1 byte. As a result, it is possible to perform an uninterruptible switching operation by avoiding an unnecessary path switch.

In addition, in the case where there arises such trouble that a portion for processing a bit becomes "0", since the BIP operation result is inserted into the J1 byte in the first through the 63rd frames in the sender side and the inverted BIP operation result is inserted into the J1 byte in the 64th frame in the receiver side, it is possible to detect the above error.

Here, the J1 detecting/inserting parts 22 and 90 correspond to a second predetermined byte inserting part in the claims. The error detecting parts 34A, 34B, 100A and 100B correspond to a second predetermined byte comparing part. The J1 detecting/inserting part 90 includes an inverting part. The multi-frame detecting parts 104A and 104B correspond to a synchronizing part. The B3 detecting/inserting parts 24 and 54 correspond to a first correcting part. The B3 detecting/inserting parts 38A, 38B, 106A and 106B correspond to a second correcting part. The J1 detecting/inserting parts 36A, 36B, 102A and 102B include a fixed value inserting part. The pointer detecting parts 20 and 50 correspond to a first path alarm detecting part. The pointer detecting parts 30A, 30B, 60A and 60B correspond to a second path alarm detecting part.

What is claimed is:

1. A sender side apparatus to which a path error monitoring method is applied for monitoring for an error in a communication path in a synchronous network by using an error detection code normally inserted into a first predetermined byte in an overhead in transmitted information, comprising:

a second predetermined byte inserting part performing an error detection code operation for a predetermined range in the transmitted information to obtain an error correction code normally inserted into a first predetermined byte in an overhead of transmitted information, and inserting the obtained error detection code into a second predetermined byte different from said first predetermined byte in the overhead in the transmitted information;

wherein the second predetermined byte inserting part has an inverting part inverting the error detection code obtained through the error detection code operation alternatively at a predetermined period and inserting the resulting error detection code into said second predetermined byte.

2. The sender side apparatus as claimed in claim 1, wherein said second predetermined byte is within an operation range of said first predetermined byte, further comprising a first correcting part computing difference information between original contents in the second predetermined byte and said error detection code obtained through said error detection code operation and correcting contents in said first predetermined byte by inserting a difference between said difference information and original contents in the first predetermined byte into said first predetermined byte.

3. The sender side apparatus as claimed in claim 2, further comprising a first path alarm detecting part detecting a path alarm from contents of the overhead in transmitted information, wherein said second predetermined byte inserting part and said first correcting part are halted when said path alarm is detected.

4. A receiver side apparatus to which a path error monitoring method is applied for monitoring for an error in a communication path in a synchronous network by using an error detection code normally inserted into a first predetermined byte in an overhead in transmitted information is applied, comprising: a second predetermined byte comparing part performing an error detection code operation for a predetermined range in the transmitted information received and comparing the obtained error detection code with a second predetermined byte in the transmitted information received; and a synchronizing part taking synchronization when a comparison result of said second predetermined byte comparing part indicates switching from a status where all bits coincide to a status where no bit coincides.

5. The receiver side apparatus as claimed in claim 4, further comprising a second path alarm detecting part detecting a path alarm from contents of the overhead in transmitted information received, wherein said second correcting part and said fixed value inserting part are halted when said path alarm is detected.

6. The receiver side apparatus as claimed in claim 4, wherein said second predetermined byte is within an operation range of said first predetermined byte, further comprising a second correcting part computing difference information between contents in the second predetermined byte in the transmitted information received and the error detection code obtained through said error detection code operation and correcting contents in said first predetermined byte by inserting a difference between said difference information and contents in the first predetermined byte in the transmitted information received into said first predetermined byte, and a fixed value inserting part inserting a fixed value into the second predetermined byte in the transmitted information received.

7. The receiver side apparatus as claimed in claim 6, wherein said fixed value inserting part is capable of variably setting said fixed value.

* * * * *